(No Model.)
C. N. ASSELSTINE.
ANVIL FOR FORMING PLOWSHARES.
No. 371,163. Patented Oct. 11, 1887.
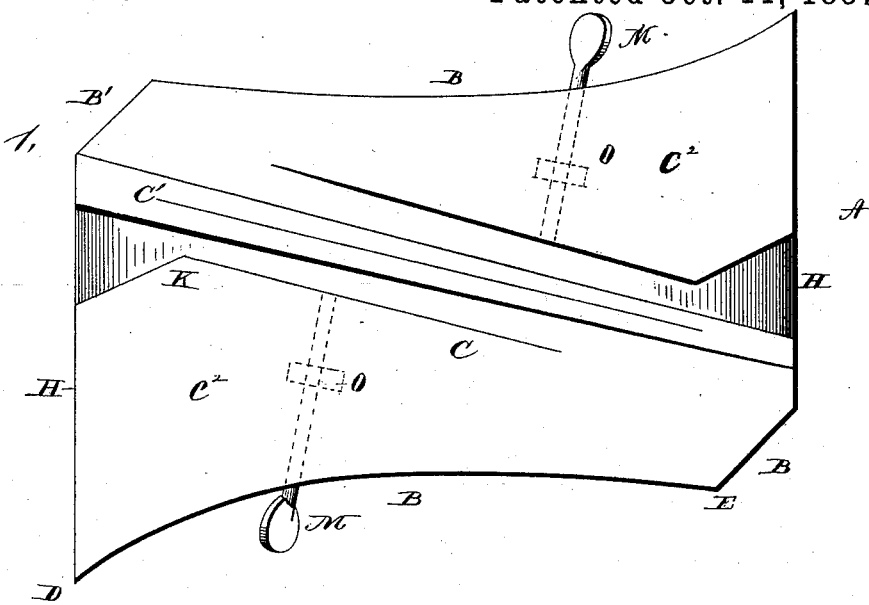
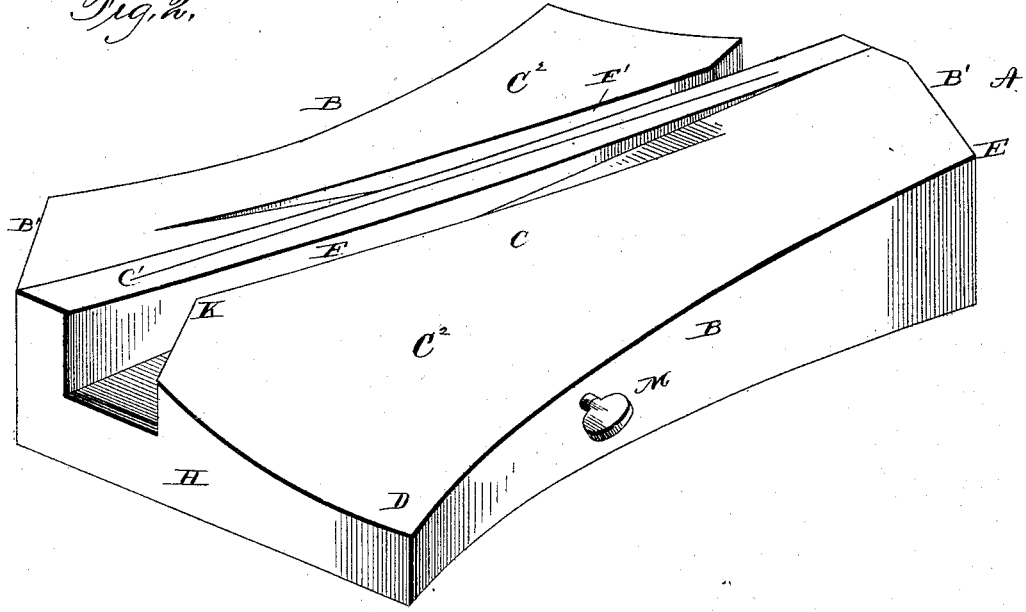
Witnesses
F. L. Durand
Chas. Rhodes
Inventor
Chas. N. Asselstine
By his Attorney Geo. Poulton

UNITED STATES PATENT OFFICE.

CHARLES NICHOLAS ASSELSTINE, OF HAMILTON, DAKOTA TERRITORY.

ANVIL FOR FORMING PLOWSHARES.

SPECIFICATION forming part of Letters Patent No. 371,163, dated October 11, 1887.

Application filed April 30, 1887. Serial No. 236,608. (No model.)

*To all whom it may concern:*

Be it known that I, CHARLES NICHOLAS ASSELSTINE, a citizen of the United States, residing at Hamilton, in the county of Pembina, Territory of Dakota, have invented certain new and useful Improvements in Anvils; and I do hereby declare the following to be a full, clear, and exact description of the invention, such as will enable others skilled in the art to which it appertains to make and use the same.

My invention relates to improvements in that class of anvils specially adapted to be used in welding or securing together the shares and adjacent metallic parts of a plow either in making or repairing said parts; and it consists in an anvil constructed as hereinafter set forth and claimed.

In the accompanying drawings, Figure 1 represents a plan view of an anvil embodying the features of my invention. Fig. 2 represents a perspective view thereof.

Similar letters refer to similar parts in the different figures.

The anvil illustrated in the figures of the drawings is formed of a body, A, of suitable metal, having its opposite sides concave, as at B, and the ends right-lined or straight, with two diagonal or oblique opposite corners, B'. The face or upper surface, C, of the anvil is diagonally divided by the center line, C', into halves, each of which has a concave portion, C², the outer left-hand corner, D, of which is lower than the right-hand corner, E, and the outer wall of the groove F, the said concave portions corresponding in shape, respectively, to the configuration of the upper face of the shares of a stubble and a breaking plow. Near the center line, and on both sides thereof and at opposite ends, are grooves F F', which gradually increase in depth from near one of the oblique corners to the opposite straight end H. These grooves are of substantially uniform width, except from the point K, where they increase to the end H. The portion of the face C between the center line, C', and the grooves F F is inclined from said center line to the inner wall of each of said grooves, and the center line is also slightly concave, as shown.

In using the anvil, the flange of the plowshare, when properly heated, is placed in one of the grooves, and the share being also heated and properly laid thereon is welded thereto, the flange of the said share being securely held in place by means of a screw-bolt, M, which works in an opening in the body B, said opening leading into the groove F, so that the end of the bolt M can be brought in contact with the flange of the plowshare, when desired. In the base of the anvil are openings O, in which are nuts adapted to connect with the bolt M.

Owing to the concave form of the face C the share is easily kept in position during the welding of the same to the flange of the plowshare, which operation is a matter of great difficulty in operating with anvils of the ordinary construction requiring additional assistance in welding the parts of the plow.

In another application, filed by me of even date herewith, is shown and described an anvil having convex face portions and grooves of different character, with other features, the said anvil also being designed to be used in welding the parts of a landside together.

What I claim, and desire to secure by Letters Patent, is—

1. An anvil having its face portion divided diagonally into halves by a ridge, each half having a concave portion corresponding to two different forms of plowshares, and a groove, said parts being substantially as described, and for the purpose set forth.

2. An anvil having its face portion divided into halves, each half having a concave portion, C², and a groove, substantially as and for the purpose set forth.

3. An anvil having its face portion divided into halves, each half thereof having a concave portion, C², and a groove of increasing depth and of uniform width except at its outer ends, substantially as and for the purpose set forth.

4. An anvil having its face portion divided into halves, each half thereof having a concave portion, C², and a groove extending from near one corner to the straight opposite side, and having in its side an opening leading to the groove, and the binding-screw, M, working in said opening, substantially as described.

In testimony whereof I affix my signature in presence of two witnesses.

CHARLES NICHOLAS ASSELSTINE.

Witnesses:
 JOHN MCMILLAN.
 WINNIE MCMILLAN.